(12) United States Patent
Brown et al.

(10) Patent No.: US 11,751,552 B2
(45) Date of Patent: Sep. 12, 2023

(54) FISH DESCENDING DEVICE

(71) Applicant: Seaqualizer Ventures, LLC, Davie, FL (US)

(72) Inventors: Patrick B Brown, Miami, FL (US); Jeffrey Liederman, Cooper City, FL (US); Ryan M Brown, Miami, FL (US)

(73) Assignee: SEAQUALIZER VENTURES, LLC, Davie, FL (US)

( * ) Notice: Subject to any disclaimer, the term of this patent is extended or adjusted under 35 U.S.C. 154(b) by 0 days.

(21) Appl. No.: 17/122,608

(22) Filed: Dec. 15, 2020

(65) Prior Publication Data

US 2021/0176974 A1 Jun. 17, 2021

Related U.S. Application Data

(60) Provisional application No. 62/948,299, filed on Dec. 15, 2019.

(51) Int. Cl.
*A01K 95/00* (2006.01)
*A01K 95/02* (2006.01)
*A01K 83/00* (2006.01)

(52) U.S. Cl.
CPC .............. *A01K 95/02* (2013.01); *A01K 83/00* (2013.01)

(58) Field of Classification Search
CPC ........ A01K 95/00; A01K 97/00; A01K 83/00; A01K 91/06; A01K 99/00; A01K 65/00
See application file for complete search history.

(56) References Cited

U.S. PATENT DOCUMENTS

| | | | | |
|---|---|---|---|---|
| 2,448,954 | A * | 11/1944 | Brown | A01K 91/03 |
| 7,162,829 | B2 * | 1/2007 | Braaten | A01K 85/14 |
| | | | | 43/42.23 |
| 7,596,901 | B1 * | 10/2009 | Johnson | A01K 91/06 |
| | | | | 43/43.1 |
| 2015/0082685 | A1 * | 3/2015 | Poston | A01K 83/00 |

* cited by examiner

*Primary Examiner* — Joshua J Michener
*Assistant Examiner* — Henry Hooper Mudd
(74) *Attorney, Agent, or Firm* — Trueba & Suarez, PLLC; Roberto M. Suarez, Esq.

(57) ABSTRACT

A descending device including a member providing a fish attachment point, a member providing a means of traversing the suspension point, a moveable member to attach the suspension line and traverse to the alternate suspension point, a member that applies a moment about a suspension point to reverse the orientation of the device and stops that prevent the attachment member from coming off the descending device.

1 Claim, 7 Drawing Sheets

100

200

200

FISH DESCENDING DEVICE

CROSS-REFERENCE TO RELATED APPLICATIONS

This application is a non-provisional of, and claims priority to, U.S. Provisional Patent Application No. 62/948,299, filed on Dec. 15, 2019 and titled "Descending Device for Fish Suffering from Barotrauma;" which application is incorporated by reference as if fully set forth herein.

FIELD OF THE INVENTION

The present invention generally relates to a fishing device and more specifically, to a device for returning a fish to a depth so the fish can recover from barotrauma.

BACKGROUND OF THE INVENTION

Catching fish in deep water (50 feet or greater) and bringing the fish to the surface causes the gases in a fish's swim bladder to expand, causing the fish to become buoyant. If the fish is discarded it will float on the surface and be unable to return to depth, lowering the survival rate. Fishing can be prohibited in areas where protected fish stocks become unsustainable. If barotrauma descending devices are used the fish are returned to depth and allowed to recover and reproduce. This keeps fish stocks healthy and areas remain open to recreational fishing.

Descending devices consist of a number of configurations. The most common is the upside down hook with a weight attached. These can be cumbersome and dangerous to use since the fish and weight must be held in an awkward position when lowering the fish. When a boat has high gunnels the fish must be tossed into the water such that it lands in the correct position to descend to depth. If not done correctly, the fish falls off the hook and floats away and dies.

Accordingly, there is a need for an easy to use descending hook that suspends both the weight and fish without fear of the fish releasing too soon.

SUMMARY OF THE INVENTION

We disclose a descending device that allows one person to easily lower a weighted hook, with fish attached, through the air and into the water without fear of the fish falling off even in a boat with high freeboards.

A non-limiting embodiment of the invention is comprised of a single bent wire to which is attached a slide ring and a weight. The wire has a proximal end and a distal end. A hook, without a barb, is fashioned at the proximal end, bent back towards itself and pointing towards the distal end. An attachment point, such as a ring, is formed at the distal end. The weight is attached at the attachment point at the distal end. The slide ring is slidingly attached to the wire such that the wire passes through the ring and the ring is free to slide on the wire between the distal end and the proximal end—thus, substantially between the hook and the weight.

An object of the present invention is that the various components thereof are configured such that the device is attached to a line via the slide ring. The wire is free to slide within the slide ring. A fish to be returned to water at a proper depth, is placed on the hook (preferably through the flesh of the lower jaw), the weight of the fish ensures that the wire is pulled down on the slide ring, positioning the slide ring up proximate to the weight. After the fish is lowered back into the water, to be released, the fish, which is now more buoyant that the weight due to the expanding gases in the fish's swim bladder, is suspended above the weight and distal end of the wire and the slide ring has now slid up to the bend in the proximal end of the wire that forms the hook. In this orientation the hook now faces down and the fish is pulled down to a proper depth by the weight. Once the proper depth has been reached and the fish has re-compressed, the device can be pulled up and the hook released from the fish, which can now swim away safely.

BRIEF DESCRIPTION OF THE DRAWINGS

In the accompanying figures, like reference numerals refer to identical or functionally similar elements throughout the separate views. The accompanying figures, together with the detailed description below are incorporated in and form part of the specification and serve to further illustrate various embodiments and to explain various principles and advantages all in accordance with the present invention, in which.

Figure 1:
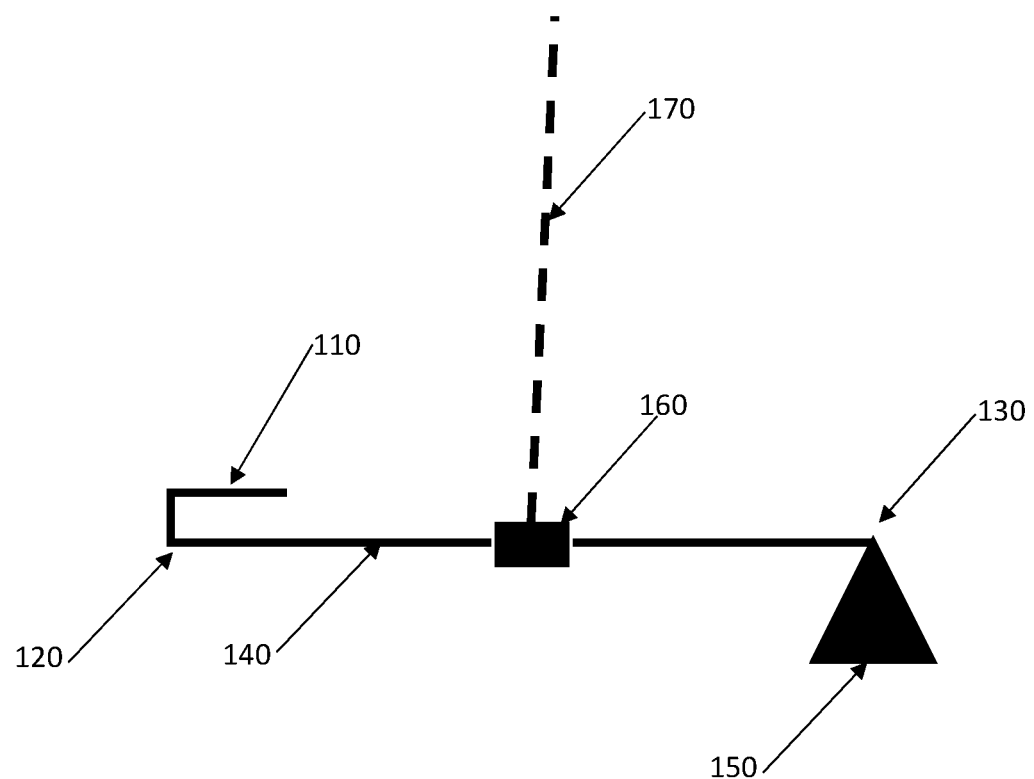
FIG. 1 shows a side view of a simplified representation of a device according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

In this specification and in the appended claims and drawings, words and phrases have the meanings commonly attributed to them in the relevant art except as otherwise specified herein. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein. While certain aspects of conventional technologies and methods in the relevant art have been discussed to facilitate disclosure of the invention, Applicant in no way disclaims these technical aspects or methods, and it is contemplated that the claimed invention may encompass one or more of the conventional technical aspects or methods discussed herein.

Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Specifically, component names, types, and values, as depicted in the exemplary schematic diagrams, are not intended to limit the scope of the present invention and are presented only as possible embodiments.

Referring now to the figures, we disclose a fish descending device according to exemplary, non-limiting, embodiments of the present invention. FIG. 1 shows a simplified representation according to an embodiment.

The device 100 is comprised of a rigid member 110 having a proximal end 120 and a distal end 130. A hook 140 is formed at the proximal end 120 such that the end of the hook points substantially back towards the distal end 130. A weight 150 is attached to the distal end. A slide 160 is constrained in sliding relation on the rigid member 110 between the proximal end 120 and the distal end 130. The hook 140 and weight 130 form physical stops on the rigid member 110 such that the slide 160 is not able to translate (slide) off of the device. The slide 160 is further configured with attachment geometry adapted to receive a line, cord, cable or other similar means of suspending 170 (shown for reference only in FIG. 1) the device 100 and the slide 160 becomes the suspension point about which the device 100 can slide or pivot.

To use the device 100, a user attaches a means of suspension 170 to the device 100 at the slide 160. The means of suspension 170 is any known line, cord, or equivalent. The slide 160 is moved to a position substantially proximate to the weight 150, causing the rigid member 110 to be disposed in an approximately vertical orientation with the hook 140 end pointed substantially upward. A fish that has been caught and is desired to be released back into the water is hooked onto the device 100 inserting the hook 140 through the fish's lower jaw. The weight of the fish on the device 100 maintains the device 100 in a substantially vertical position with the fish securely attached via the hook 140. The device 100 is then lowered into the water by the means for suspension 170. Once in the water, since the fish is more buoyant than the weight, the device changes in attitude—sliding and pivoting about the suspension point. As the weight lowers in the water, the relative position of the weight and the fish flips—while above water, the weight was above the fish, now, below water, the weight falls below the fish—and the slide 160 translates up the rigid member 110 towards the proximal end 120, stopping at the hook 140. With the hook 140 now pointing downward, the fish is pulled down by the device until it reaches the proper depth. Once at depth, the device is pulled up by the suspension device and the hook disengages from the fish. The fish is free to swim now without having suffered any barotrauma. The device 100 can then be pulled back up out of the water and used again.

Figure 2:
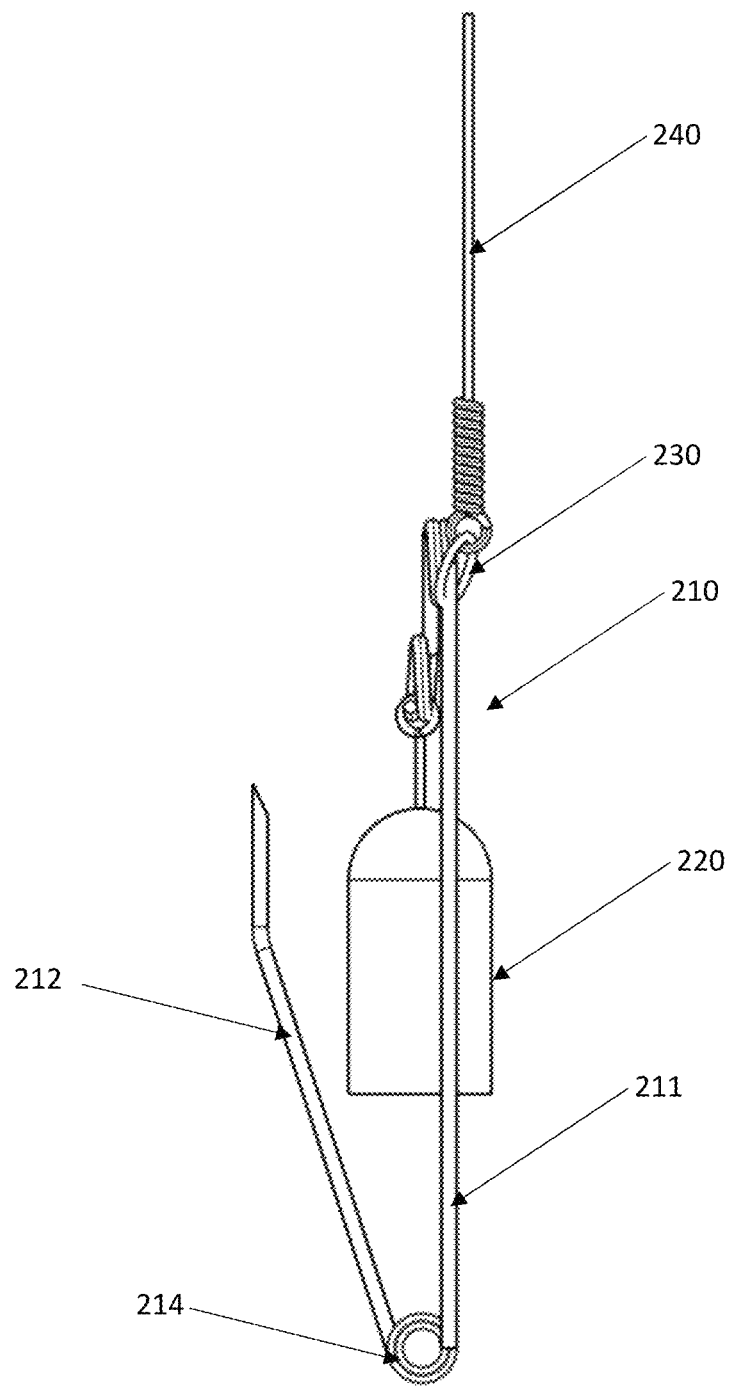
FIG. 2 shows a side view of a device according to an embodiment of the present invention, in the above-water state.
Figure 3:
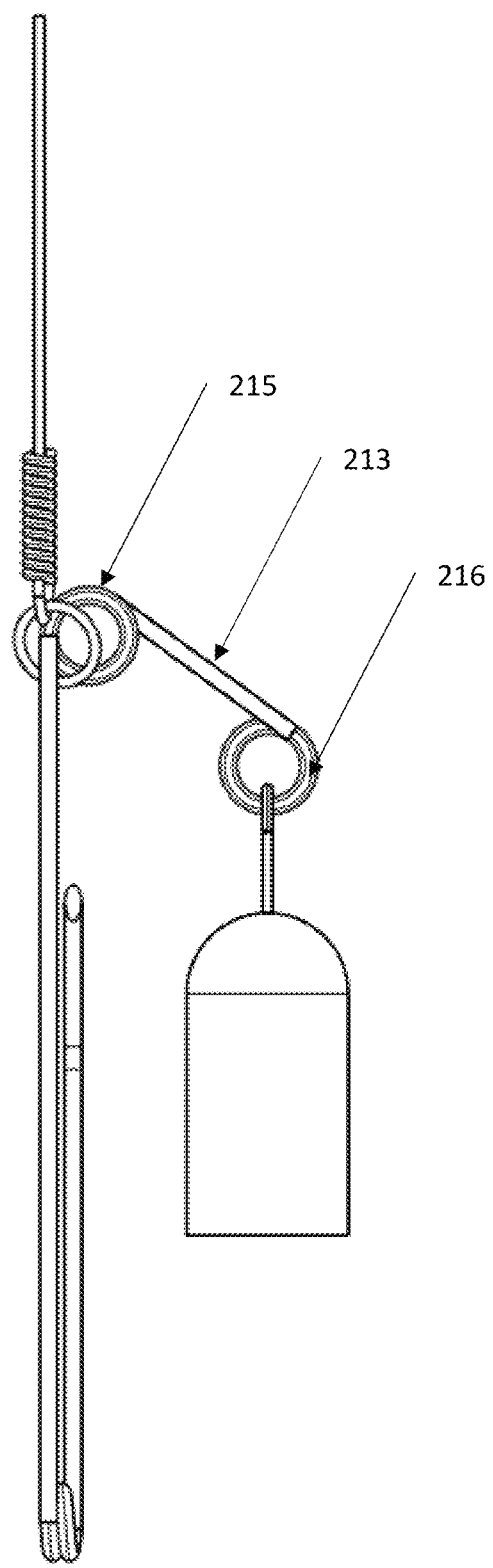
FIG. 3 shows a front view of the device of FIG. 2.
Figure 4:
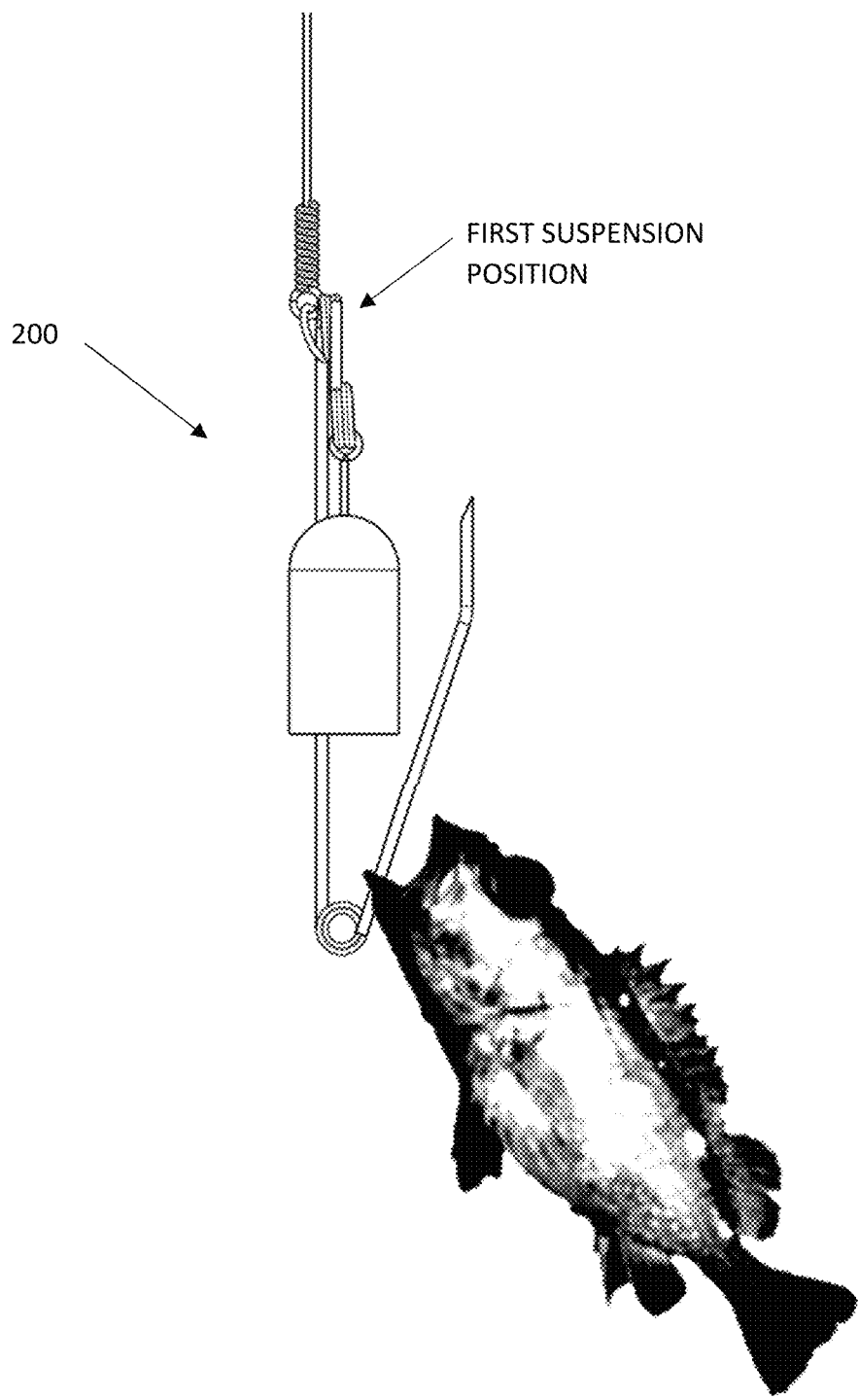
FIG. 4 shows another side view of the device shown in FIG. 2, with a fish hanging by its lower lip while it is in the above-water state.
Figure 5:
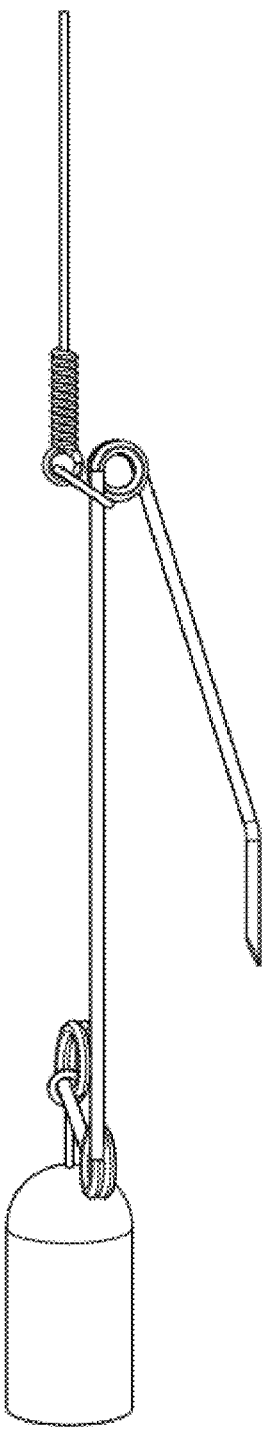
FIG. 5 shows the device of FIG. 2 in the reversed-orientation side view in the in-water state.
Figure 6:
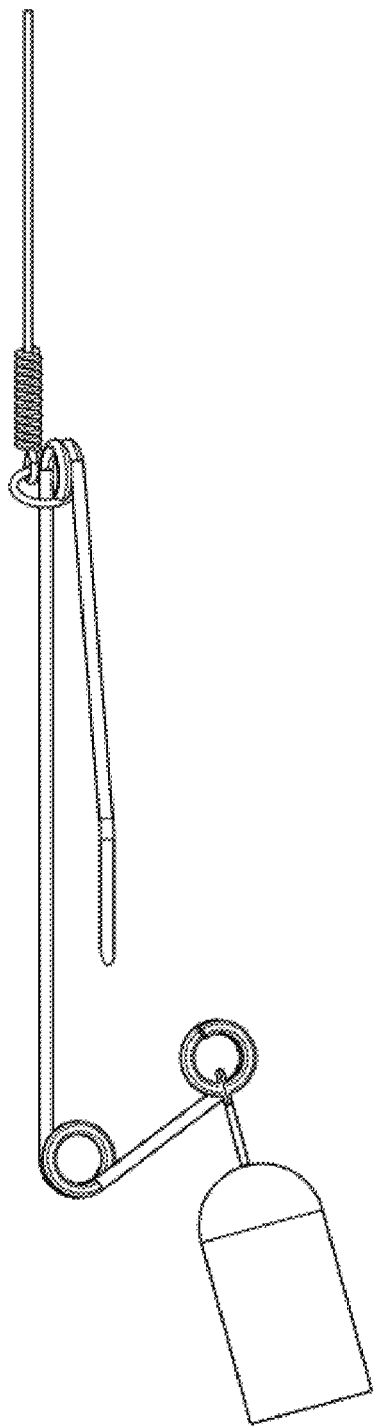
FIG. 6 shows the device of FIG. 2 in the reversed-orientation front view in the in-water state.
Figure 7:
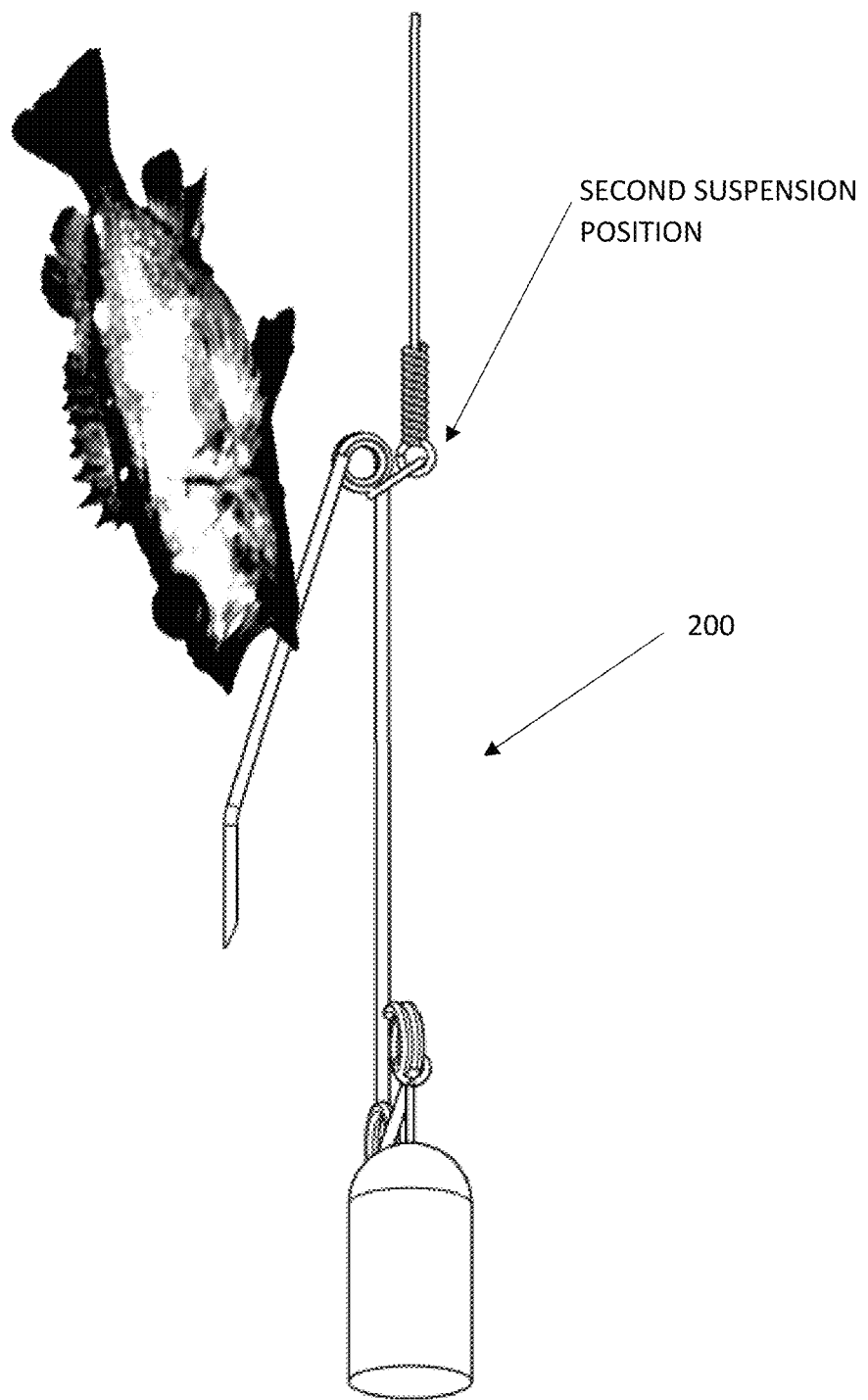
FIG. 7 shows the device of FIG. 2 in the reversed-orientation with the fish attached through its lower lip, being descended through the water.

A preferred embodiment of the present invention is shown and described as device 200. FIGS. 2-7 show this exemplary embodiment in different views, with FIGS. 2-4 depicting the device 200 in the state as it would be above the water, in the lowering orientation. FIGS. 5-7 depict the device 200 in the state that it would be in the water, in the descending orientation.

Specifically referring to FIGS. 2-3 and 5-6, device 200 is comprised of a rigid wire 210 that is bent to create fixed member 211, hook member 212, and weight member 213. The rigid wire 210 is further bent to create a hook stop loop 214 between the fixed member 211 and the hook member 212, and a weight stop loop 215 between the fixed member 211 and the weight member 212. An attachment loop 216 is formed at the free end of the weight member 212.

A weight 220 is attached to the rigid wire 210 at the attachment loop 216.

A sliding member 230 is attached on the rigid wire 210 in sliding relation relative to the fixed member 211 between the hook stop loop 214 and the weight stop loop 215. In this embodiment the sliding member 230 is a ring.

A suspension line 240 is attached to the sliding member 230.

Above-Water Lowering Orientation

FIG. 4 shows the device with a fish attached and being lowered through the air. The fish is hanging by its lower lip on hook member 212. Sliding member 230 is in the first point of suspension, with both the fish and weight below this first point of suspension.

In-Water Descending Orientation

FIG. 7 shows the device in its in-water descending position. The sliding member 230 has moved to a second point of suspension. In this orientation the fish is approximately at or above this second point of suspension and the weight 220 is below this second point of suspension. Upon entering the water, the buoyant fish lags the weight 220, causing the sliding member 230 to move to the second point of suspension. This occurs when weight 220 acts upon weight member 212 creating a moment about weight stop loop 215. The descending device 200 then turns upside down and the sliding member 230 moves to the water descending position and pulls the buoyant fish to a lower depth.

When the optimum depth is reached, the fisherman exerts an upward pull on suspension line 240, pulling hook member 212 out of the fish's mouth and allowing the fish to swim away at a suitable depth with its swim bladder recompressed.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure. In particular, features from one embodiment can be used with another embodiment. The embodiments were chosen and described to best explain the principles of the disclosure and the practical application, and to enable others of ordinary skill in the art to understand the invention for various embodiments with various modifications as are suited to the particular use contemplated.

The invention claimed is:

1. A method for returning a fish to depth so the fish can recover from barotrauma, the method comprising:

providing a device for returning a fish to depth so the fish can recover from barotrauma, the device comprising:
  a rigid wire having a proximal end and a distal end;
  a hook disposed on the rigid wire at the proximal end;
  a weight fixedly attached to the rigid wire at the distal end; and
  a sliding member disposed on the rigid wire in sliding relation between the proximal end and the distal end;
providing a suspension line attached to the device at the sliding member;
attaching a fish onto the hook of the device, the fish hanging by its lower lip on the hook and the sliding member in a first point of suspension, with both the fish and the weight below the first point of suspension;
lowering the device with the attached fish into the water;
moving of the sliding member to a second point of suspension by the weight acting on the device with the fish lagging due to its buoyancy;
turning of the device into an upside-down position by action of the sliding member sliding to the second suspension position;
pulling of the fish to a lower depth by the device; and
exerting an upward pull on the suspension line upon reaching the lower depth thereby pulling the hook out of the fish's mouth, whereby the fish has been returned to depth and recovered from barotrauma.

* * * * *